United States Patent
Backes

(10) Patent No.: US 12,296,796 B2
(45) Date of Patent: May 13, 2025

(54) ELECTROHYDRAULIC BRAKE VALVE WITH OVERPRESSURE PROTECTION

(71) Applicant: ZF Off-Highway Solutions Minnesota Inc, North Mankato, MN (US)

(72) Inventor: Peter Backes, North Mankato, MN (US)

(73) Assignee: ZF Off-Highway Solutions Minnesota Inc, North Mankato, MN (US)

( * ) Notice: Subject to any disclaimer, the term of this patent is extended or adjusted under 35 U.S.C. 154(b) by 0 days.

(21) Appl. No.: 18/163,012

(22) Filed: Feb. 1, 2023

(65) Prior Publication Data

US 2023/0311834 A1  Oct. 5, 2023

Related U.S. Application Data

(60) Provisional application No. 63/325,172, filed on Mar. 30, 2022.

(51) Int. Cl.
| | |
|---|---|
| *B60T 13/68* | (2006.01) |
| *F16K 17/04* | (2006.01) |
| *F16K 27/04* | (2006.01) |
| *F16K 27/12* | (2006.01) |

(52) U.S. Cl.
CPC ........ *B60T 13/686* (2013.01); *F16K 17/0473* (2013.01); *F16K 27/048* (2013.01); *F16K 27/12* (2013.01); *B60T 2270/403* (2013.01)

(58) Field of Classification Search
CPC ............. B60T 13/686; B60T 2270/403; F16K 17/0473; F16K 27/048; F16K 27/12; F16K 31/10; F16K 31/0686; F16K 31/0696

USPC ..................................................... 251/129.19
See application file for complete search history.

(56) References Cited

U.S. PATENT DOCUMENTS

| | | | | |
|---|---|---|---|---|
| 4,201,116 | A * | 5/1980 | Martin ................ | F15B 13/0436 335/266 |
| 4,605,197 | A * | 8/1986 | Casey ................ | G05D 16/2097 335/229 |
| 4,741,364 | A * | 5/1988 | Stoss ..................... | F15B 13/042 137/625.6 |
| 4,886,091 | A * | 12/1989 | Coleman ............... | F15B 13/044 251/129.1 |
| 5,967,413 | A * | 10/1999 | Tian ..................... | F02M 59/466 239/533.9 |
| 8,042,789 | B2 * | 10/2011 | Dayton ............... | F16K 31/0613 251/129.15 |
| 10,533,584 | B1 * | 1/2020 | Zähe ..................... | F16K 17/105 |
| 2012/0285568 | A1 * | 11/2012 | Schulz ................ | F15B 13/0435 251/30.01 |

* cited by examiner

*Primary Examiner* — John Bastianelli

(74) *Attorney, Agent, or Firm* — Finch & Maloney PLLC

(57) ABSTRACT

An improved electrohydraulic brake valve with overpressure protection is provided. The electrohydraulic brake valve includes an integrated pressure limiting device coupled to a modulating valve and a solenoid assembly. The pressure limiting device transmits an axial force from the solenoid plunger to the valve spool up to a set limit, which corresponds to a maximum output pressure. Above this set limit, a pre-loaded spring within the pressure limiting device compresses, thereby isolating further travel of the solenoid plunger from the valve spool. The pressure limiting device mechanically limits the output pressure of the electrohydraulic brake valve to a maximum level to prevent overpressure in the brake system, adding a level of safety not previously available.

18 Claims, 3 Drawing Sheets

ELECTROHYDRAULIC BRAKE VALVE WITH OVERPRESSURE PROTECTION

RELATED APPLICATIONS

This application claims the benefit under 35 U.S.C. § 119(e) of U.S. Provisional Patent Application No. 63/325,172, titled ELECTROHYDRAULIC BRAKE VALVE WITH OVERPRESSURE PROTECTION, and filed on Mar. 30, 2022, the contents of which are incorporated herein by reference in its entirety.

FIELD OF THE DISCLOSURE

The present disclosure relates to electrohydraulic brake valves and, in particular, to integrated overpressure protection for electrohydraulic brake valves

BACKGROUND

Electrohydraulic brake valves provide hydraulic power for normal and emergency braking in electrohydraulic braking systems and traction control systems. Electrohydraulic brake valves are solenoid-operated valves that are actuated by a valve driver. The valve driver converts an electronic command signal into an electrical current or voltage that powers the electrohydraulic brake valve. The higher the command, the higher the electrical current or voltage. The higher the electrical current or voltage, the higher the hydraulic pressure output from the electrohydraulic brake valve, sometimes as high as 3000 PSI.

As noted above, electrohydraulic brake valves are controlled by software and are actuated by an electronic valve driver that generates an electrical current or voltage. There exists the possibility that the software in the controller or the valve driver could fail in such a way that full system current or voltage is applied across the electrohydraulic brake valve's solenoid. The resultant output from the valve may then exceed the maximum rated pressure of the vehicle brakes. Failure of the vehicle brakes may occur in an unsafe manner or may result in machine downtime and expensive repairs.

Existing pressure limiting solutions for hydraulic brake valves include the use of vehicle brakes with a pressure rating equal to or higher than the potential brake pressure from the electrohydraulic brake valve. However, this is not always feasible due to cost and availability of vehicle brakes. Other solutions include the addition of a pressure limiting device between the electrohydraulic brake valve and the vehicle brakes. This solution adds additional costs to the brake system and the addition of new risks associated with the failure of the added device.

SUMMARY

An improved electrohydraulic brake valve with overpressure protection is provided. The electrohydraulic brake valve includes an integrated pressure limiting device coupled to a modulating valve and a solenoid assembly. The pressure limiting device transmits an axial force from the solenoid plunger to the valve spool up to a set limit, which corresponds to a maximum output pressure. Above this set limit, a pre-loaded spring within the pressure limiting device compresses, thereby isolating further travel of the solenoid plunger from the valve spool. The pressure limiting device mechanically limits the output pressure of the electrohydraulic brake valve to a maximum level to prevent overpressure in the brake system, adding a level of safety not previously available.

In one embodiment, the pre-loaded spring ("overpressure spring" as used herein) is disposed in series between the solenoid plunger and the valve spool. The overpressure spring is captured between a plunger and a cage. The plunger is moveable in fixed relation relative to the solenoid plunger, and the cage is movable in fixed relation relative to the valve spool. The overpressure spring includes a spring force that is just above the force required for normal operation of the modulating valve. When the force from the solenoid assembly exceeds this spring force, the overpressure spring begins to compress. The overpressure spring continues to compress as the solenoid force increases, until the solenoid assembly runs out of available stroke. The rate of compression of the overpressure spring in the pressure limiting device is low enough that the over-pressure is limited to an acceptable level.

In this and other embodiments, the solenoid assembly can include a coil, an iron core armature, and a plunger. When electrical power is supplied to the coil, which surrounds the armature, the coil generates an electromagnetic field through the armature. The plunger is driven by the electromagnetic field in the energized direction. The force of the plunger is proportional to the power supplied to the coil, such that a larger current results in a larger force of the plunger. The solenoid plunger is in constant engagement with the plunger of the pressure limiting device, which moves in the energized direction, causing the cage and the spool to also move in the energized direction. In the energized position, pressurized fluid is permitted to flow from a pressure port to a work port for operation of a vehicle brake.

If the controller software or the valve driver fails in such a way that a full system voltage is applied across the solenoid assembly, the resultant output of the electrohydraulic brake valve is limited to a maximum output pressure. In addition, when the brake pedal is fully applied, output brake pressure is limited by the overpressure spring between the pedal and the spool for modulating brake pressure. The overpressure spring is held in a pocket in such a way that it transmits force to the spool up to a set limit, which corresponds to a maximum output pressure. The present invention therefore adds a level of safety that was not previously available in a compact design integrated into the electrohydraulic brake valve itself.

These and other features and advantages of the present invention will become apparent from the following description of the invention, when viewed in accordance with the accompanying drawings and appended claims.

DETAILED DESCRIPTION

Figure 1:
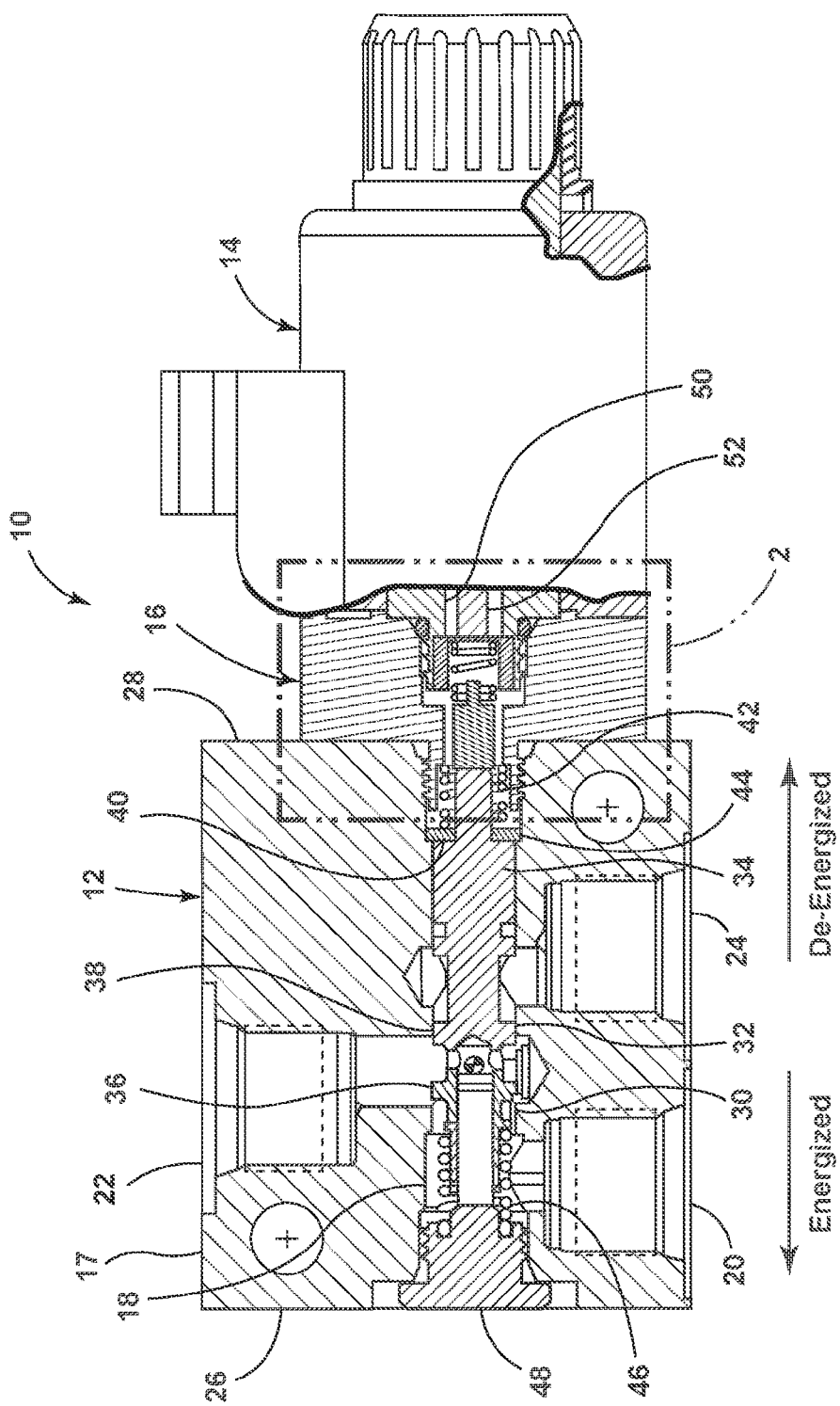
FIG. 1 is a cross-sectional view of a first embodiment of an electrohydraulic brake valve shown in a neutral position.
Figure 2:
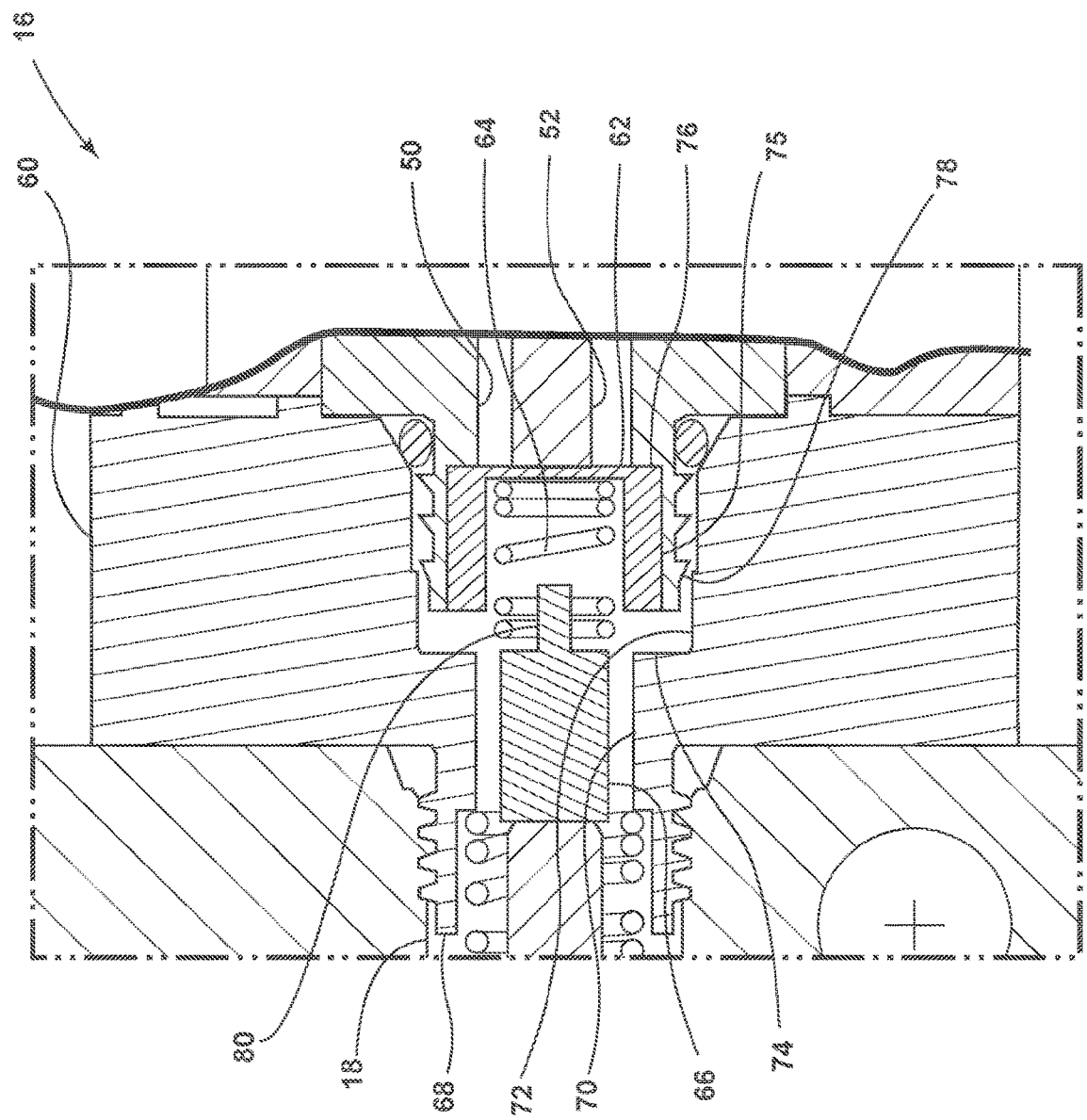
FIG. 2 is a cross-sectional close-up view of the pressure limiting device depicted in FIG. 1.

Referring to FIGS. 1-2, an electrohydraulic brake valve in accordance with a first embodiment is illustrated and generally designated 10. The electrohydraulic brake valve (EBV) 10 includes a modulating valve 12 coupled to a solenoid assembly 14. A pressure limiting device 16 is disposed between the modulating valve 12 and the solenoid assembly 14 to mechanically limit the output pressure of the EBV 10 to a maximum level to prevent overpressure in the brake system. Each such component of the EBV 10 is discussed below.

The modulating valve 12 includes a valve body 17 that defines a bore 18, a tank port 20, a work port 22, and a pressure port 24. The bore 18 extends through the valve body 17, from a first end 26 of the valve body 17 to a second end 28 of the valve body 17. Each of the ports 20, 22, 24 are in fluid communication with the bore 18. In the illustrated embodiment, the tank port 20 is disposed proximate the first end 26 and the pressure port 24 is disposed proximate the second end 28. The work port 22 is disposed intermediate the tank and pressure ports 20, 24. In other embodiments however the pressure port 24 may be proximate the first end 26 and the tank port 20 may be proximate the second end 28. The tank port 20 provides a connection location for fluid communication with a fluid reservoir, the work port 22 provides a connection location for fluid communication with a working unit, and the pressure port 24 provides a connection location for fluid communication with a hydraulic pump. Typical port connections include standard SAE straight threads for allowing hoses or other conduits to be connected to the valve body 17.

As also shown in FIG. 1, the bore 18 includes a first annular surface 30 and a second annular surface 32. These surfaces cooperate with a movable spool 34 to direct fluid between the ports 20, 22, 24 as the solenoid assembly 14 is energized and de-energized. The spool 34 includes a first annular portion 36 and a second annular portion 38 that coincide with the first annular surface 30 and the second annular surface 32, respectively. The spool 34 also includes a shoulder 40 proximate the second end 28 of the valve body 12. The modulating valve 12 also includes a first spring 42 extending around the spool 34 proximate the second end 28 of the valve body 12. The first spring 42 is a compression spring and is seated against a washer 44 in a countersunk region of the bore 18 proximate the second end 28 of the valve body 12. At the first end 26 of the valve body 12, a return spring 46 is retained by a plug 48 and biases the spool 34 in the de-energized direction (right, in the configuration shown).

The solenoid assembly 14 includes an armature 50, such as a coil and iron core armature, and a plunger 52. When electrical power is supplied to the coil (which surrounds the armature 50), the coil generates an electromagnetic field through the armature. The plunger 52 is ferromagnetic and is driven by the electromagnetic field in the energized direction. The force of the plunger 52 is proportional to the power supplied to the coil, such that a larger current (or voltage) results in a larger force of the plunger 52.

The pressure limiting device 16 is more specifically shown in FIG. 2. The pressure limiting device 16 is configured to limit the output pressure of the EBV 10 to a maximum level to prevent overpressure in the brake system. In the embodiment shown in FIG. 2, the pressure limiting device 16 includes a housing 60, a first piston 62, a overpressure spring 64, and a second piston 66. The housing 60 includes an externally threaded stem 68 that engages internal threads within the countersunk portion of the bore 18. The housing 60 also includes a counter-bore comprising a first (large) diameter portion 72 and a second (small) diameter portion 70. The first diameter portion 72 and the second diameter portion 70 are joined at a shelf 74. The shelf 74 functions to limit axial travel of the first piston 62 in the energized direction. The first piston 62 is biased against the plunger 52 in the de-energized direction by the overpressure spring 64. The first piston 62 is cup-shaped, having a cylindrical sidewall 75 and a flat base 76. The first piston 62 is received within an externally barbed stem portion 78 of the solenoid assembly 14. The overpressure spring 64 is seated within the cup-shaped first piston 62 and extends around a stem 80 protruding from the second piston 66. A clearance exists between the outer sidewall of the second piston 66 and the housing 60, such that the second piston 66 is free to modulate in the energized and de-energized directions. The spool 34 moves in the energized direction against the return spring 46 before further compression of the overpressure spring 64.

Operation of the EBV 10 will now be described. In the de-energized position shown in FIG. 1, pressurized fluid at the pressure port 24 is prevented from reaching the working port 22 due to the close fit of the second annular surface 32 of the valve body and the second annular portion 38 of the spool 34. In this position, the work portion 22 remains open to the tank port 20, such that the work portion 22 and the tank port 20 are at equilibrium.

When pressurized fluid is desired to operate the working unit, the solenoid assembly 14 is energized by a driving current. The solenoid assembly 14 begins developing an axial force, driving the solenoid plunger 52 in the energized direction. The solenoid plunger 52 is in constant engagement with the first piston 62, which moves in the energized direction, causing the second piston 66 and the spool 34 to also move in the energized direction, overcoming the axial force of the return spring 46. In the energized position, pressurized fluid is permitted to flow from the pressure port 24 to the work port 22 for operation of a working unit, for example a vehicle brake. At the same time, fluid flow to the tank port 20 is obstructed by a close fit between the first annular surface 30 of the valve body and the first annular portion 36 of the spool 34. Pressurized fluid acting on the spool 34 causes the spool 34 to move in the de-energized direction, causing modulation (back and forth movement) of the spool 34 until equilibrium is reached. At steady state equilibrium, the spool 34 will attain a stabilized position where fluid flow from the pressure port 24 to the work port 22 equals the fluid flow from the work port 22 to the tank port 20.

When the solenoid assembly 14 is de-energized, the spool 34 moves in the de-energized direction by action of the return spring 46. The opposing spring 42 allows the spool 34 to move beyond the neutral position (shown in FIG. 1) to a relieving position. In the relieving position, pressurized fluid is allowed to rapidly flow from the working port 22 to the tank port 20. As the fluid is released, the fluid pressure acting on the opposing spring 42 decreases, and the spool 34 returns to the neutral position shown in FIG. 1.

If the control software or the valve driver fails in such a way that a full system voltage is applied across the EBV 10, the resultant output of the EBV 10 is limited to a maximum output pressure. In addition, when the brake pedal is fully applied, output brake pressure from the EBV 10 is limited by the overpressure spring 64 between the pedal and the spool 34 for modulating brake pressure. The overpressure spring 64 is held in a pocket in such a way that it transmits force to the spool 34 up to a set limit, which corresponds to a maximum output pressure. Above this set limit, the overpressure spring 64 compresses, thereby isolating further travel of the solenoid plunger 52 from the valve spool 34.

The present invention therefore adds a level of safety that was not previously available in a compact design integrated into the EBV itself.

Figure 3:
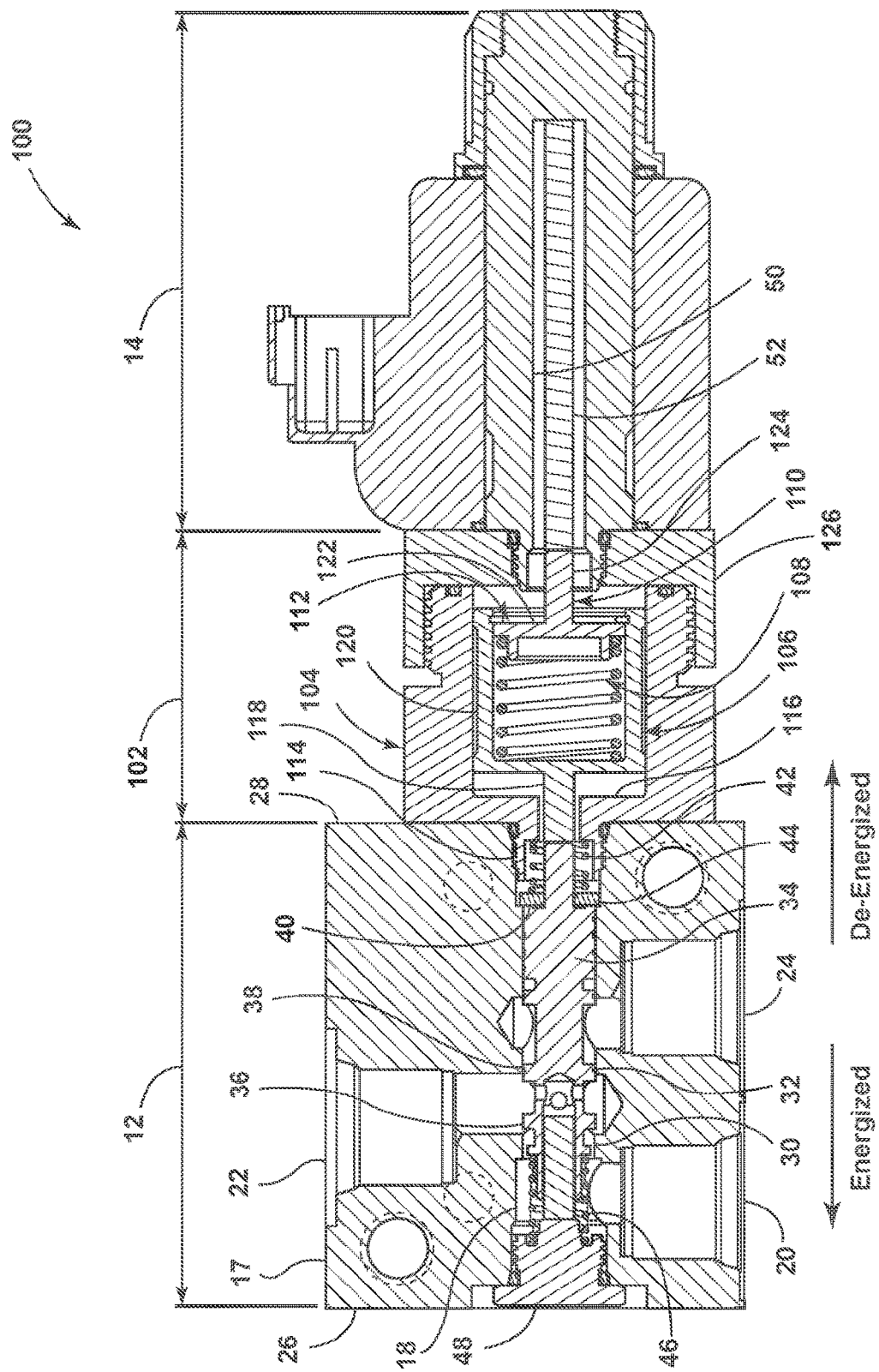
FIG. 3 is a cross-sectional view of a second embodiment of an electrohydraulic brake valve shown in the neutral position.

Referring to FIG. 3, an electrohydraulic brake valve in accordance with a second embodiment is illustrated and generally designated 100. The electrohydraulic brake valve 100 of FIG. 3 is structurally and functionally similar to the electrohydraulic brake valve 10 of FIGS. 1-2, except with respect to the pressure limiting device, which is modified to accommodate a larger spring. For consistency herein, the modulating valve 12 and the solenoid assembly 14 of FIG. 3 includes the same reference numerals as recited above. The pressure limiting device of FIG. 3 is generally designated 102 and will now be described.

In particular, the pressure limiting device 102 of FIG. 3 includes a housing 104, a cage 106, an overpressure spring 108, a plunger 110, and a snap ring 112. The overpressure spring 108 is pre-loaded to transmit force from the solenoid assembly 14 directly to the spool 34 of the modulating valve 12 without any compression of the overpressure spring 108. The spring constant for the overpressure spring 108 is selected to be just above the force needed for normal operation of the modulating valve 12. When the force from the solenoid assembly 14 exceeds this spring setting, the overpressure spring 108 begins to compress. The overpressure spring 108 continues to compress as the solenoid force increases, until the solenoid assembly runs out of available stroke. The rate of compression of the overpressure spring 108 in the pressure limiting device 102 is low enough that the over-pressure is limited to an acceptable level.

More specifically, the housing 104 includes an externally threaded stem 114 that engages internal threads within the bore 18 of the valve body 17. The housing 104 also includes a counter-bore having an annular shelf 116. The cage 106 includes a stem 118 and a head 120, the head 120 being cup-shaped to receive the overpressure spring 108 therein. The plunger 110 of the pressure limiting device 102 includes a spring seat 122 and a stem 124, the spring seat 122 including an outer diameter than is slightly less than the inner diameter of the cage 106, such that the plunger 110 can travel axially therein. The stem 124 is in direct engagement with the solenoid plunger 52. The snap ring 112 is positioned aft of the spring seat 122, around the stem 124 of the pressure limiting device 102, to block withdrawal of the plunger 110 from the cage 120. The pressure limiting device 102 further includes a cover 126 having a counter-bore that is internally threaded for attachment to each of the housing 104 and the solenoid assembly 14.

In the de-energized position shown in FIG. 3, pressurized fluid at the pressure port 24 is prevented from reaching the working port 22 due to the close fit of the second annular surface 32 of the valve body and the second annular portion 38 of the spool 34. In this position, the work portion 22 remains open to the tank port 20, such that the work portion 22 and the tank port 20 are at equilibrium. When pressurized fluid is desired to operate the working unit, the solenoid assembly 14 is energized by a driving current. The solenoid assembly 14 begins developing an axial force, driving the solenoid plunger 52 in the energized direction. The solenoid plunger 52 is in constant engagement with the pressure limiting device plunger 110, which moves in the energized direction, causing the spool 34 to also move in the energized direction, overcoming the axial force of the return spring 46.

In the energized position, pressurized fluid is permitted to flow from the pressure port 24 to the work port 22 for operation of a working unit, for example a vehicle brake. At the same time, fluid flow to the tank port 20 is obstructed by a close fit between the first annular surface 30 of the valve body and the first annular portion 36 of the spool 34. Pressurized fluid acting on the spool 34 causes the spool 34 to move in the de-energized direction, causing modulation (back and forth movement) of the spool 34 until equilibrium is reached. At steady state equilibrium, the spool 34 will attain a stabilized position where fluid flow from the pressure port 24 to the work port 22 equals the fluid flow from the work port 22 to the tank port 20.

When the solenoid assembly 14 is de-energized, the spool 34 moves in the de-energized direction by action of the return spring 46. The opposing spring 42 allows the spool 34 to move beyond the neutral position (shown in FIG. 3) to a relieving position. In the relieving position, pressurized fluid is allowed to rapidly flow from the working port 22 to the tank port 20. As the fluid is released, the fluid pressure acting on the opposing spring 42 decreases, and the spool 34 returns to the neutral position shown in FIG. 3.

As set forth above, the overpressure spring 108 is held in a pocket in such a way that it transmits force to the spool 34 up to a set limit, which corresponds to a maximum output pressure. If the control software or the valve driver fails in such a way that a full system voltage is applied across the EBV 100, the resultant output of the EBV 100 is limited to a maximum output pressure. The overpressure spring 108 compresses as the solenoid force increases, until the solenoid assembly runs out of available stroke. The present invention therefore adds a level of safety that was not previously available in a compact design integrated into the EBV itself.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

The invention claimed is:

1. A pressure limiting device for an electrohydraulic brake valve having a modulating valve including a valve body and a valve spool, the valve body defining a bore and a plurality of ports in fluid communication with the bore, the valve spool being slideably moveable in the bore in an energized direction and a de-energized direction, and a solenoid assembly including a solenoid plunger that is movable relative to an armature in the energized direction in response to an electrical current or voltage, the pressure limiting device being physically connected to the modulating valve and the solenoid assembly, the pressure limiting device comprising:
- a housing defining a counter-bore with an annular shelf interconnecting a first portion of the counter-bore and a second portion of the counter-bore threadably joined to the modulating valve;
- a cage within the housing, the cage including a stem portion that is axially movable within the first portion of the counter-bore and a head portion that is axially movable within the second portion of the counter-bore;
- an overpressure spring that is series-connected between the valve spool and the solenoid plunger;
- a snap ring secured to the cage to prevent retraction of the solenoid plunger from the cage; and
- a cover threadably joined to the housing and to the solenoid assembly.

2. The pressure limiting device of claim 1, wherein the overpressure spring is pre-loaded within the head portion of the cage.

3. The pressure limiting device of claim 1, wherein the head portion of the cage is cup-shaped and includes a base and a cylindrical sidewall, and wherein the base of the cage can engage the housing to limit axial travel of the cage in an energized direction.

4. The pressure limiting device of claim 1, wherein the stem portion of the cage is directly engaged with the valve spool-within the modulating valve.

5. The pressure limiting device of claim 1, wherein the housing includes an externally threaded neck portion that engages an internally threaded opening within the modulating valve.

6. The pressure limiting device of claim 1, wherein the solenoid plunger includes a large diameter portion and a small diameter portion, the small diameter portion extending through the snap ring in engagement with the solenoid assembly.

7. The pressure limiting device of claim 1, wherein the cover includes a larger diameter portion threadably engaged to the housing and a small diameter portion threadably engaged to the solenoid assembly.

8. The pressure limiting device of claim 1, wherein the overpressure spring compresses in response to an axial force from the solenoid assembly being higher than a pre-loaded compression force on the overpressure spring.

9. An electrohydraulic brake valve comprising:
- a modulating valve including a valve body and a valve spool, the valve body defining a bore and a plurality of ports in fluid communication with the bore, the valve spool being slideably moveable in the bore in an energized direction and a de-energized direction;
- a solenoid assembly including a solenoid plunger that is movable relative to an armature in the energized direction in response to an electrical current or voltage; and
- a pressure limiting device between the valve assembly and the solenoid assembly, the pressure limiting device including an overpressure spring that is series-connected between the solenoid plunger and the valve spool, a cage for housing the overpressure spring therein, and a housing defining a counter-bore with an annular shelf interconnecting a first portion of the counter-bore and a second portion of the counter-bore,
- wherein the cage includes a stem portion that is axially movable within the first portion of the counter-bore,
- wherein the cage includes a head portion that is axially movable within the second portion of the counter bore, and
- wherein the pressure limiting device limits an output pressure of the modulating valve to a maximum level when actuated by the solenoid plunger.

10. The electrohydraulic brake valve of claim 9, wherein the head portion of the cage is cup-shaped and includes a base and a cylindrical sidewall, wherein the base engages the annular shelf of the counter-bore to limit axial travel of the cage in the energized direction.

11. The electrohydraulic brake valve of claim 10, further including a snap ring to prevent removal of a spring seat from the head portion of the cage, the overpressure spring being axially confined between the cage and the spring seat.

12. The electrohydraulic brake valve of claim 11, wherein the spring seat is disk-shaped and is movable in fixed relation relative to the solenoid plunger.

13. The electrohydraulic brake valve of claim 9, wherein the pressure limiting device is threadably engaged to the modulating valve.

14. The electrohydraulic brake valve of claim 9, further including a return spring at a first end of the spool to bias the spool in the de-energized direction.

15. The electrohydraulic brake valve of claim 14, further including a compression spring at a second end of the spool, wherein the compression spring is positioned to oppose travel of the spool beyond a neutral position in the de-energized direction.

16. The electrohydraulic brake valve of claim 9, wherein the plurality of ports includes a tank port, a work port, and a pressure port.

17. The electrohydraulic brake valve of claim 9, wherein the overpressure spring is pre-loaded within the pressure limiting device.

18. The electrohydraulic brake valve of claim 9, wherein the overpressure spring compresses in response to an axial force from the solenoid plunger being higher than a pre-loaded compression force on the overpressure spring.

\* \* \* \* \*